US010666590B2

(12) United States Patent
Dubie et al.

(10) Patent No.: US 10,666,590 B2
(45) Date of Patent: May 26, 2020

(54) SECURE SENT MESSAGE IDENTIFIER

(71) Applicant: Dropbox, Inc., San Francisco, CA (US)

(72) Inventors: Jack Dubie, Menlo Park, CA (US);
Michael Roeder, Oakland, CA (US);
Steven Kabbes, Mountain View, CA (US)

(73) Assignee: Dropbox, Inc., San Francisco, CA (US)

(*) Notice: Subject to any disclaimer, the term of this patent is extended or adjusted under 35 U.S.C. 154(b) by 352 days.

(21) Appl. No.: 14/139,805

(22) Filed: Dec. 23, 2013

(65) Prior Publication Data
US 2015/0113077 A1 Apr. 23, 2015

Related U.S. Application Data

(60) Provisional application No. 61/893,844, filed on Oct. 21, 2013.

(51) Int. Cl.
*H04L 12/58* (2006.01)
*H04L 29/06* (2006.01)

(52) U.S. Cl.
CPC ............ *H04L 51/12* (2013.01); *H04L 63/12* (2013.01); *H04L 51/16* (2013.01)

(58) Field of Classification Search
CPC ....... H04L 51/22; H04L 51/34; H04L 61/307; H04L 12/589
USPC ........................................................ 709/206
See application file for complete search history.

(56) References Cited

U.S. PATENT DOCUMENTS

| 6,330,589 | B1* | 12/2001 | Kennedy | G06Q 10/107 707/999.104 |
| 6,640,301 | B1* | 10/2003 | Ng | G06Q 10/107 705/14.73 |
| 7,024,457 | B1* | 4/2006 | Newman | H04L 51/36 379/100.08 |
| 7,634,651 | B1* | 12/2009 | Gerde | H04L 63/0428 713/153 |
| 7,707,258 | B2* | 4/2010 | Peisl | G06Q 10/107 709/206 |
| 7,899,184 | B2 | 3/2011 | Vataja | |
| 7,921,176 | B2* | 4/2011 | Madnani | G06Q 10/107 709/207 |
| 8,583,743 | B1* | 11/2013 | Gailloux | H04L 51/066 707/756 |

(Continued)

FOREIGN PATENT DOCUMENTS

EP 2 458 806 A1 5/2012

*Primary Examiner* — Vivek Srivastava
*Assistant Examiner* — Binod J Kunwar
(74) *Attorney, Agent, or Firm* — DLA Piper LLP (US)

(57) ABSTRACT

A message management service allows a user to access and manage messages from various message services. The user can access the message management service using a message management client application executing on a client device and can draft messages using the message management client application and send the messages through the different message services. The message management service can add information to messages sent using the message management client application that can be used to identify and organize the messages. A secure sent-message identifier can be added to messages sent by the message management service to reliably indicate that the messages were sent by the message management service.

14 Claims, 5 Drawing Sheets

(56) References Cited

U.S. PATENT DOCUMENTS

| | | | |
|---|---|---|---|
| 8,621,008 B2* | 12/2013 | Chebiyyam | H04L 51/16 709/204 |
| 8,819,145 B1* | 8/2014 | Gailloux | H04L 51/36 455/412.1 |
| 8,837,717 B1* | 9/2014 | Thorpe | H04L 51/18 380/44 |
| 2003/0187941 A1* | 10/2003 | Suzuki | H04L 51/12 709/206 |
| 2004/0092310 A1 | 5/2004 | Brosnan et al. | |
| 2004/0221014 A1* | 11/2004 | Tomkow | H04L 51/30 709/206 |
| 2004/0230657 A1* | 11/2004 | Tomkow | H04L 51/30 709/206 |
| 2005/0021963 A1* | 1/2005 | Tomkow | H04L 51/30 713/171 |
| 2005/0198511 A1* | 9/2005 | Tomkow | H04L 51/30 713/176 |
| 2006/0224683 A1* | 10/2006 | Briscoe | G06F 17/30958 709/207 |
| 2006/0265456 A1* | 11/2006 | Dietrich | G06F 21/606 709/206 |
| 2006/0271630 A1* | 11/2006 | Bensky | G06Q 10/107 709/206 |
| 2007/0032223 A1* | 2/2007 | Alberth, Jr. | H04M 1/274516 455/416 |
| 2007/0124402 A1* | 5/2007 | Irwin | H04L 51/00 709/206 |
| 2007/0244973 A1* | 10/2007 | Pearson | G06Q 10/107 709/206 |
| 2008/0085729 A1* | 4/2008 | Lira | H04L 12/5895 455/466 |
| 2008/0104181 A1* | 5/2008 | Golan | G06Q 10/107 709/206 |
| 2009/0187831 A1* | 7/2009 | Tiwana | G06Q 10/107 715/752 |
| 2009/0313554 A1* | 12/2009 | Haynes | G06Q 10/107 715/752 |
| 2010/0011077 A1* | 1/2010 | Shkolnikov | H04L 51/063 709/206 |
| 2010/0042523 A1* | 2/2010 | Henry | G06Q 10/10 705/34 |
| 2010/0174784 A1* | 7/2010 | Levey | H04L 51/34 709/206 |
| 2010/0198712 A1* | 8/2010 | Benisti | G06Q 10/107 705/34 |
| 2010/0250691 A1* | 9/2010 | Tomkow | H04L 51/30 709/206 |
| 2010/0281122 A1* | 11/2010 | Li | G06Q 10/107 709/206 |
| 2011/0206197 A1* | 8/2011 | Gillin | G06Q 30/02 379/221.05 |
| 2011/0270748 A1 | 11/2011 | Graham, III et al. | |
| 2012/0066498 A1* | 3/2012 | Engert | G06F 21/51 713/170 |
| 2012/0110092 A1* | 5/2012 | Keohane | G06Q 10/107 709/206 |
| 2013/0124402 A1* | 5/2013 | Hilbush | G06Q 10/06311 705/39 |
| 2013/0124548 A1* | 5/2013 | Chhaparia | G06Q 10/107 707/758 |
| 2013/0238728 A1* | 9/2013 | Fleck | H04L 51/36 709/206 |
| 2013/0326224 A1* | 12/2013 | Yavuz | H04L 9/3247 713/176 |
| 2014/0019559 A1* | 1/2014 | Schultz | G06Q 10/107 709/206 |
| 2015/0195231 A1* | 7/2015 | Mahajan | H04L 51/18 709/206 |

* cited by examiner

SECURE SENT MESSAGE IDENTIFIER

CROSS-REFERENCE TO RELATED APPLICATION

This application claims the benefit of U.S. Provisional Application No. 61/893,844, filed Oct. 21, 2013, entitled "Secure Sent Message Identifer" the disclosure of which is incorporated by reference herein in its entirety.

BACKGROUND

The present disclosure relates generally to message management, and more specifically to using a secure identifier to identify a source of messages to prevent spoofing.

Email is a common form of message-based communication between devices connected via a computer network, such as the Internet. Email messages can include several components, such as a message body and message header. The message header can include fields that identify metadata associated with the message, such as a sender email address, a recipient email address, a time stamp, subject, etc. Messages are typically transmitted over the computer network using a transport protocol, such as the Simple Mail Transfer Protocol (SMTP). A message can be drafted by a user on a user device, such as a computer, smart phone, tablet, or other communication device, in an email client. The email client can communicate with an email server to send and receive messages using an access protocol such as the Post Office Protocol (POP) or the Internet Message Access Protocol (IMAP). Messages are sent using email addresses which identify recipient user(s) and domain name(s) and the sending user. Messages can be stored remotely at an email server, locally on a user device, or in multiple locations.

Spoofing of a source of a sender generally refers to a method of forging the source of data to conceal the identity of the sender or to impersonate a sender. In the context of email messages, email spoofing can include changing the contents of header fields to make it appear that an email was received from a different email address than the actual sender's address. Spoofing presents a security risk, as a malicious user may be able to gain access to an otherwise protected system by appearing to be a known or otherwise authorized user.

SUMMARY

Embodiments of the present invention are directed to a message management service through which a user can access and manage messages (emails, text messages, social media messages, etc.) from various message services (email providers, social media services, etc.). The user can access the message management service using a message management client application executing on a client device (smartphone, tablet, computer, etc.) and can draft messages using the message management client application and send the messages through the different message services. The message management service can add information (message identifier, thread identifier, account identifier, etc.) to messages sent using the message management client application that can be used to identify and organize the messages.

When a message is sent from an application it is possible to change (spoof) information in the message (headers, etc.) to make it appear as though the message was sent by a different application, by a different user, etc. If the information added to a message by the message management service is changed, this can potentially lead to security and/or processing efficiency problems. Accordingly, embodiments of the present invention provide systems and methods that can reliably determine whether a particular message was sent using the message management client application.

In some embodiments, when a user sends a message using the message management client application, the message management service can add a unique identifier to the message (e.g., in the message header or message body). The identifier can be based on message-specific information and on information that is not readily identifiable from the message. For example, the identifier can be, or include, a digital signature that is generated based on an account identifier associated with the user and a private key that is known only to the message management service and is not derived from, calculated based on, or otherwise readily identifiable from the message. The account identifier, private key, and an item of message-specific information (e.g., a representation of all or part of the message content) can be concatenated or otherwise combined, and a hash value can be generated. The hash value can be used as the unique identifier, or it can be combined with additional information such as a message identifier. The message, including the unique identifier, can then be sent to the appropriate message service to be sent to one or more recipients. When the message, or replies to the message, are subsequently received by the message management service, the message or replies can be verified using the unique identifier.

The following detailed description together with the accompanying drawings will provide a better understanding of the nature and advantages of the present invention.

DETAILED DESCRIPTION

Figure 1:
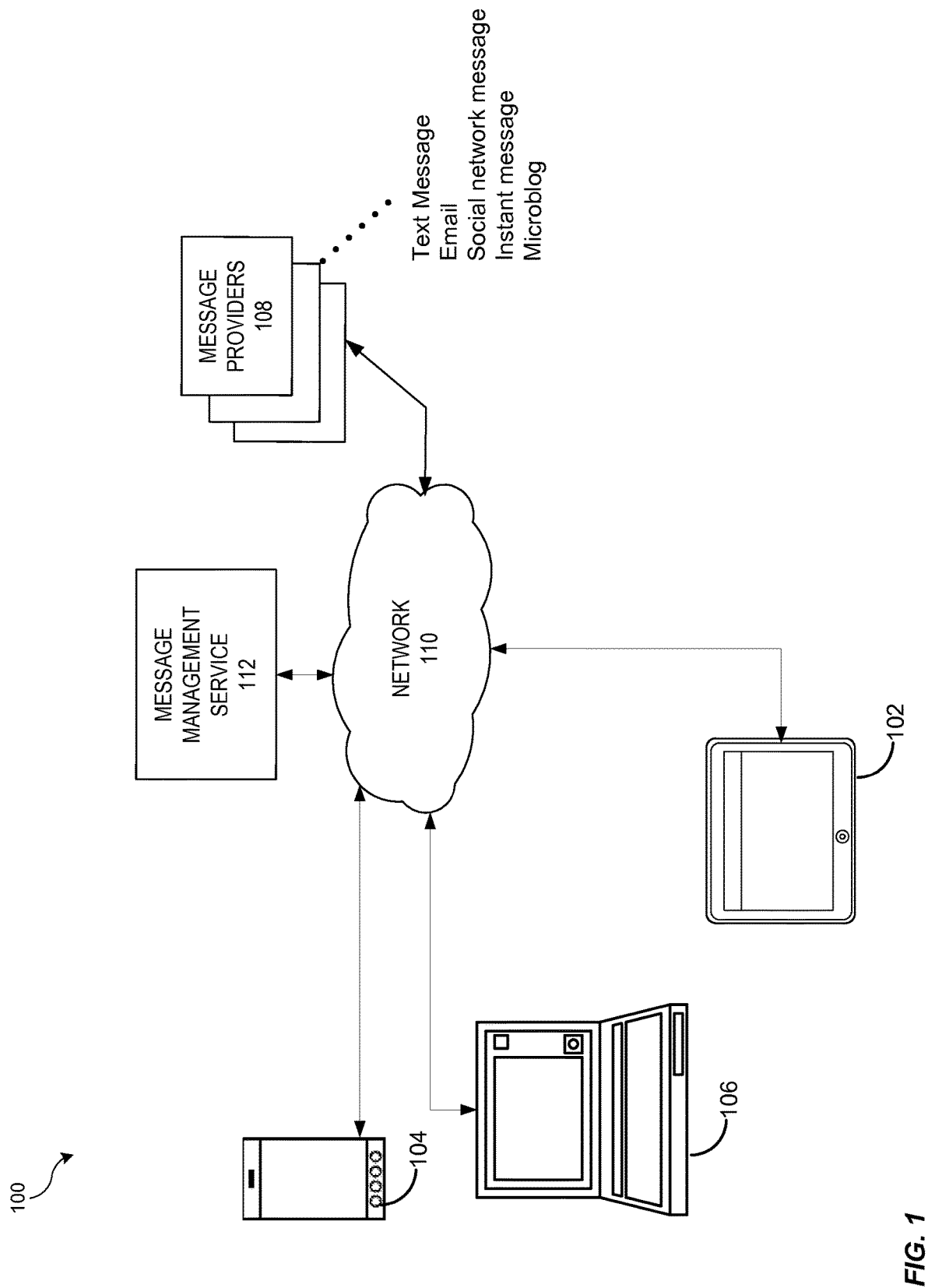
FIG. 1 shows a block diagram of a system in accordance with an embodiment of the present invention.

The following description of certain embodiments of the invention is not intended to limit the invention to these embodiments, but rather to enable any person skilled in the art to make and use this invention.

In some embodiments, messages can include email messages, text messages, social media messages, micro-blogging messages, instant messages, or other types of electronic messages that can be related as a thread. A thread can refer to a group of related messages that share a common parent message. A message can include a header portion and a body portion. The body can include the content of the message and the header can include metadata about the message. A header can include a variety of fields such as "To", "From", "Date", and "Subject". The header can also include a "message ID" that includes an identifier that uniquely identifies the message. In some embodiments, a message ID can be a globally unique identifier formatted similarly to an internet email address or other identifier in a message system where the message was created. Message IDs can be generated by combining a time, date, and/or counter stamp with the sender's domain (e.g. 12345.102113@domain.com). The header can also include an "In-Reply-To" field that identifies a message ID of a prior message to which the message is sent in response. The header can include a "References" field that can include one or more message IDs of related messages. Related messages can include one or more predecessor reference messages, such as messages that are ancestors (e.g., a grandparent message or a great grandparent message) of the message.

In certain embodiments, a data store can be maintained to store information indicating how messages are related. A data store can be implemented to store a thread identifier (thread ID) with a message identifier (message ID) of each known message that belongs to the thread. Upon receiving a message to process, each received message can be processed to determine whether the data store a message ID of the message in association with a thread ID. Identification of a message ID indicates that the message is associated with a thread identified by the thread ID. The received message can be further inspected to determine whether the received message includes one or more reference messages identified by a reference message ID.

Information in a message's header can be modified (e.g., spoofed) to conceal the identity of the sender or to impersonate a sender. As described above, spoofing can be used to gain unauthorized access to an otherwise secure system. To reduce the likelihood of a successful spoofing attack, embodiments of the present invention can add a digital signature to messages, e.g., within a header field of the message. The digital signature can be based, at least in part, on information that is not specific to the message and therefore cannot be derived from the message. If a message is received that appears to be from an authorized user, or in response to an authorized user, but does not include or includes an incorrect digital signature, the message can be identified as an attempted spoofing attack and discarded.

FIG. 1 shows message management system 100 that can include client 102, client 104, client 106, network 110, message management service 112, and message providers 108. Message management service 112 identifies and stores information relating to different messages. The information stored by message management service 112 can enable one or more clients 102, 104, 106, message providers 108, or both, to improve management and access to messages.

As used herein, a "client" refers generally to a combination of computer hardware and software that enables a user to receive one or more messages from message providers 108 and to interact with message management service 112. In the illustrated embodiment in FIG. 1, client 102 can be a mobile computing device, client 104 can be a personal computing device, and client 106 can be a tablet computing device. However, embodiments of the present invention are not limited to this illustrated embodiment as client devices 102, 104, 106 can take any form convenient for use by a user. For example, client device 102 can be a personal digital assistant (PDA), a tablet computer, a laptop computer, a desktop computer, a wearable computer, a pager, etc. Client 102 can execute a messaging application for receiving messages from message provider 108. In another example, client 104 can be a computing device executing an email application (e.g., a mailbox application) for receiving emails from message provider 108 as well as for communicating with message management service 112 to apply management services to messages received from message provider 108.

As used herein "message provider" refers generally to an entity that provides access to messages. As shown in FIG. 1, message management system 100 can include multiple message providers 108. A message provider can include message service providers including a SMSC (Short Message Service Center), a MMSC (Multimedia Message Service Center), an instant message service provider, a social network message provider, and a micro-blogging service provider, or an email service provider. Message management service 112 can include, for example, an email service that allows a user to send, receive, store, organize, and search emails, and so on. Exemplary email service providers can include Google Mail®, Yahoo Mail®, or Hotmail®.

Client 102, client 104, client 106, message management service 112, and message provider 108 can communicate with each other via network 104. Network 104 can be, for example, the Internet, a mobile network, a wireless network, a cellular network, other communication networks, or a combination thereof.

"Message management service" refers generally to a combination of computer hardware and software that can manage information about messages received from message providers 108. Message management service 112 can be a collection of servers, such as a distributed computing infrastructure, which collectively operates to manage information about messages received from message providers 108. Message management service 112 can function as an interface, or intermediary, between clients 102, 104, 106 and message providers 108. Clients 102, 104, 106 can access one or more messages from message providers 108 via message management service 112. Message management service 112 can provide message providers 108, client 102, client 104, client 106, or a combination thereof, information identifying related messages, or threads of messages.

In some embodiments, message management service 112 can use a persistent Internet Message Access Protocol (IMAP) connection for receiving and accessing messages from message providers 108. Additionally, or in the alternative, message management service 112 can use communication protocols such as post office protocol (POP) messaging application programming interface (MAPI)/exchange, service application programming interfaces (service APIs) and/or any other protocol or connection to interact with a message service provider. Outgoing messages can be delivered to the message providers 108 through typical means such as an SMTP (Simple Mail Transfer Protocol) connection or any other outbound message protocols. Message management service 112 can translate account or message updates, delivered from a client into appropriate actions to execute on message providers 108.

Message management service 112 facilitates communication of messages between client 102, 104, 106 and message providers 108. Each of message providers 108 have access to all messages for a message account (e.g., an email account), and message management service 112 can access those messages that message management service 112 receives from message providers 108. Based on received messages, message management service 112 can determine relationships between messages. Thread IDs can be stored for messages and reference messages identified in the received messages. Systems and methods for managing messages using a sent-message identifier to prevent spoofing are described below in further detail with respect to FIGS. 2-5.

Message management service 112 can provide information about threads identified in the received messages to clients to enable clients to effectively understand relationships between the messages. Message management service 112 provides computing resources to manage message information that may not be limited to a number of users, message accounts, or message providers. As a number of clients and volume of messages increase, message management service 112 can be expanded to include additional computing resources to manage message information for multiple users, accounts, and message providers, unlike client devices that are limited in computing resources. Additionally, management of message information at an intermediary computing system, such as message management service 112, enables additional value added services to be provided to client devices. For example, thread information can be useful to enable message management service 112 to group messages into folders or categories based on the thread information. Messages can then be provided from message management service to the client in an organized manner, thereby reducing use of computing resources at a client to manage messages. Identified message threads can be useful for any service or device that desires to manage activity and actions with respect to messages.

Thread information can be generated by the access protocol used to retrieve a message from a message provider, by the message provider, or by message management service 112 based on information about the message such as a message identifier or content included in the message, such as a subject, a title, or keyword. However, new outgoing messages that originate from message management service 112 do not have thread information associated with them. As described in further detail below, message management service 112 can generate a thread identifier (ID) for a new outgoing message sent through message management service 112 and can add the thread ID to the new outgoing message (e.g., to the message body or message header). To prevent an unauthorized user from spoofing the thread ID, and potentially gaining access to a different user's messages, message management service 112 can also add a digital signature to the outgoing message. The digital signature can be based, at least in part, on information that is not specific to the outgoing message and therefore cannot be derived from the message. If message management service 112 receives a message with a thread ID, but with an incorrect digital signature, message management service 112 can identify the message as an attempted spoofing attack and discard the message.

Figure 2:
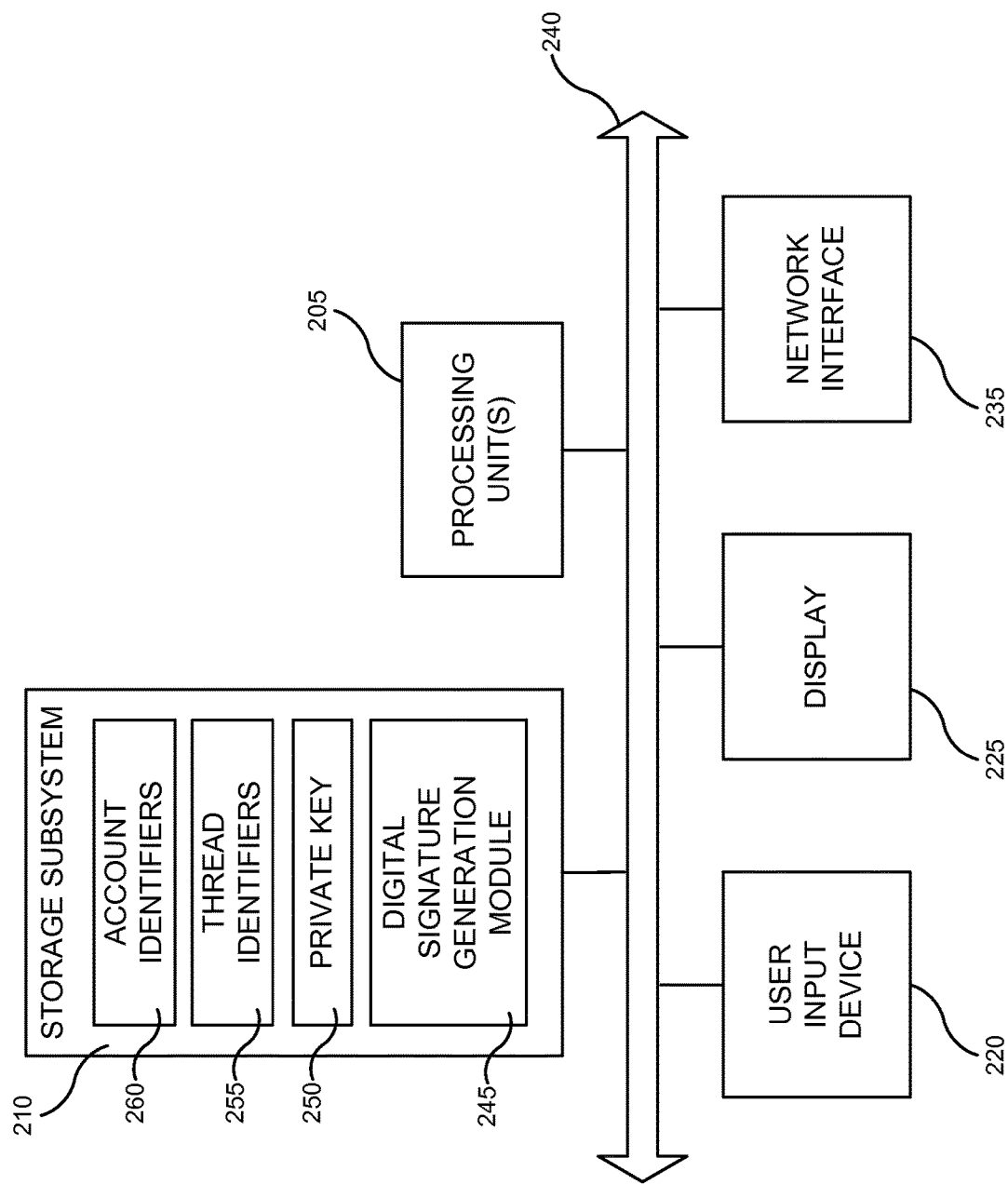
FIG. 2 shows a block diagram of a computing system in accordance with an embodiment of the present invention.

FIG. 2 shows a computer system 200 according to an embodiment of the present invention. Computer system 200 can include processing unit(s) 205, storage subsystem 210, input devices 220, display 225, network interface 235, and bus 240. Computer system 200 is a high-level block diagram of a system that can represent a mobile device, a server computer, or any of the computing devices illustrated in FIG. 1 and described herein.

Processing unit(s) 205 can include a single processor, which can have one or more cores, or multiple processors. In some embodiments, processing unit(s) 205 can include a general-purpose primary processor as well as one or more special-purpose co-processors such as graphics processors, digital signal processors, or the like.

Storage subsystem 210 can include various memory units such as a system memory, a read-only memory (ROM), and a persistent storage device. A ROM can store static data and instructions that are used by processing unit(s) 205 and other modules of electronic device 200. A persistent storage device can be a non-volatile readable and writable memory unit that stores instructions and data even when computer system 200 is powered down. System memory can be implemented using volatile read-and-write memory, such as dynamic random access memory, or non-volatile memory as desired. The system memory can store some or all of the instructions and data that are currently in use by processing unit(s) 205.

Storage subsystem 210 or units thereof can be implemented using any combination of computer-readable storage media including semiconductor memory chips of various types (DRAM, SRAM, SDRAM, flash memory, programmable ROM) and so on. Magnetic and/or optical disks can also be used. In some embodiments, storage subsystem 210 can include removable storage media that can be readable and/or writeable; examples of such media include compact discs (CD), read-only digital versatile discs (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer-readable storage media do not include carrier waves and transitory electronic signals passing wirelessly or over wired connections.

In some embodiments, storage subsystem 210 can store one or more software programs to be executed by processing unit(s) 205. For example, on a mobile device, the software programs can include a message management client application ("app"). In another example, on a server computer, the software programs can include various software modules for performing the processing described herein, such as digital signature generation module 245. "Software" refers generally to sequences of instructions that, when executed by processing unit(s) 205, cause computer system 200 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 210, processing unit(s) 205 can retrieve program instructions to execute and data to process in order to execute various operations described herein. Through suitable programming, processing unit(s) 205 can provide various functionality for computer system 200. For example, processing unit(s) 205 can execute the software programs, such as digital signature module 245.

Digital signature generation module 245, when executed, can provide a digital signature service that receives input data, applies a hash algorithm, and generates a digest (also referred to herein as a hash value or digital signature). Example of hash algorithms include the Secure Hash Algorithm (SHA) family of cryptographic hash functions. In some embodiments, storage subsystem 210 can include private key 250 that can be used by digital signature generation module 245 to generate a digital signature for a message, as described further herein. In some embodiments, storage subsystem 210 can include thread identifiers (IDs) 255 and account IDs 260 that can be used by message management system 112 to manage messages received from message providers 108.

A user interface can be provided by one or more user input devices 220, display device 225, and/or one or more other user output devices (not shown). Input devices 220 can include any device via which a user can provide signals to computing system 200; computing system 200 can interpret the signals as indicative of particular user requests or information.

Display 225 can display images generated by computer system 200 and can include various image generation technologies. Some embodiments can include a device such as a touchscreen that functions as both touch-sensitive input device and display device. In some embodiments, other user output devices can be provided in addition to or instead of display 225.

In some embodiments, the user interface can provide a graphical user interface, in which visible image elements in certain areas of display 225 are defined as active elements or control elements that the user selects using user input devices 220. For example, the user can manipulate a user input device to position an on-screen cursor or pointer over the control element, then click a button or tap a touch-sensitive surface to indicate the selection. Alternatively, the user can touch the control element (e.g., with a finger or stylus) on a touchscreen device. Other user interfaces can also be implemented.

Network interface 235 can provide voice and/or data communication capability for computer system 200. In some embodiments, network interface 235 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 235 can provide wired network connectivity (e.g., Ethernet) in addition to or instead of a wireless interface. Network interface 235 can be implemented using a combination of hardware (e.g., antennas, modulators/demodulators, encoders/decoders, and other analog and/or digital signal processing circuits) and software components.

Bus 240 can include various system, peripheral, and chipset buses that communicatively connect the numerous internal devices of computer system 200. For example, bus 240 can communicatively couple processing unit(s) 205 with storage subsystem 210. Bus 240 also connects to input devices 220 and display 225. Bus 240 also couples computer system 200 to a network through network interface 235. In this manner, computer system 200 can be a part of a network of multiple computer systems (e.g., a local area network (LAN), a wide area network (WAN), an Intranet, or a network of networks, such as the Internet. Any or all components of computer system 200 can be used in conjunction with the invention.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter.

It will be appreciated that computer system 200 is illustrative and that variations and modifications are possible. Computer system 200 can have other capabilities not specifically described here. Further, while computer system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
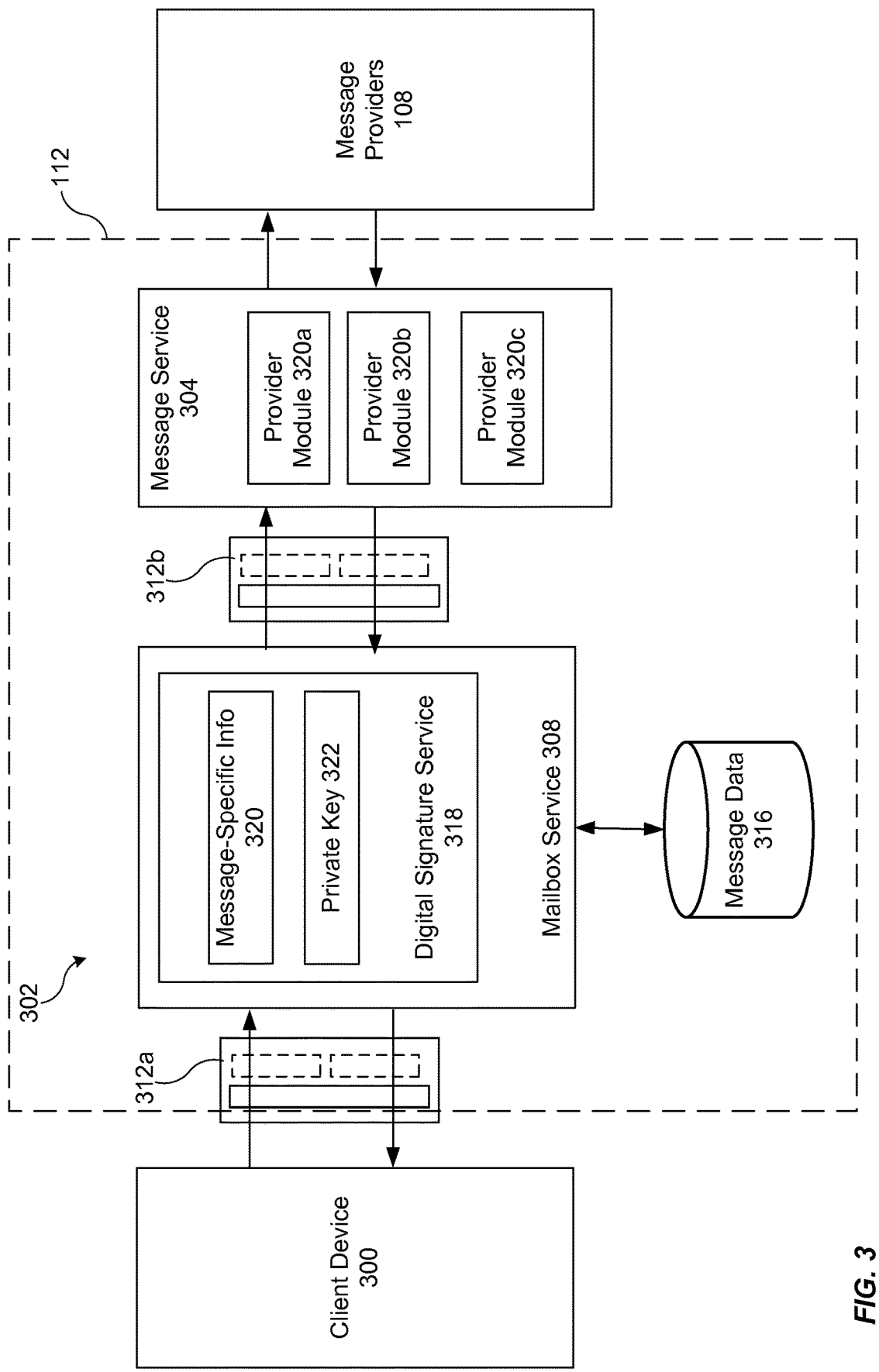
FIG. 3 shows a functional block diagram of components of a message management service in accordance with an embodiment of the present invention.

FIG. 3 is a functional block diagram of components of message management service 112 in accordance with an embodiment of the present invention. Message management service 112, in some embodiments, can act as an intermediary between service providers 108 and client device 100. The illustrated embodiment of message management service 112 includes backend server infrastructure 302 having message service layer 304, mailbox service layer 308, transfer layers 312*a-b*, and data store 316. Mailbox service layer 308 can be communicatively coupled to a message management app and possibly other apps of client device 300 via transfer layer 312*a*, and mailbox service layer 308 can be communicatively coupled to message providers 108 via transfer layer 312*b* and message service layer 304. Client device 300 can correspond to any client device that communicates with message management service 112, such as clients 102, 104, 106.

Backend server infrastructure 302 can be implemented on a managed distributed computing infrastructure, a multi-tenant computing infrastructure, a computing cluster, or on any other infrastructure. The components can include various resources that act as or provide server, load balancing, queuing, caching, database, storage, or other components. Backend server infrastructure 302 can be implemented to support a client app. Backend infrastructure 302 can serve as an intermediary layer between client apps and service providers that coordinates advanced features of the client apps.

Embodiments of message service layer 304 can function to interface with message providers 108. For example, message service layer 304 can be a server in a distributed computing infrastructure that manages message communication to and from message provider 108. In some embodiments, message service layer 304 can be a collection of servers and services that collectively operate to fulfill tasks that enable interfacing and coordinating with message service providers 108. As each message service provider 108 can have a custom implementation, message service layer 304 can include provider modules or components 320*a-c*, each specifically configured to interface with individual message service providers 108. For example, one of provider modules 320*a-c* can be configured specifically for an intended message service provider 108 and can include rules and processing instructions to account for message format issues, for interpretation of message updates, specialized features or capabilities, and/or any other processing that can be specific to the intended message service provider 108.

In some embodiments, message management service 112 can function as a proxy for client device 300. In these embodiments, message management service 112 can receive incoming messages from message providers 108, and routes such incoming messages to client device 300. Similarly, message management service 112 receives outgoing messages from client device 300, and routes such outgoing emails or text messages to message providers 108.

In some embodiments, to facilitate receiving emails from message providers 108, embodiments of message service layer 304 can use an IMAP (Internet Message Access Protocol) connection. Such IMAP connections can made per account. A benefit of message service layer 304 establishing an IMAP connection is that any number of client apps can interact with messages. For example, a user can have multiple instances of a client app open, and each instance can share a signal IMAP connection, rather than each maintaining a separate IMAP connection. In some embodiments, to facilitate sending emails, message service layer 304 can use connections, such as an SMTP (Simple Mail Transfer Protocol) connection or any other outbound message protocol connection. Message service layer 304 can additionally or alternatively use connections such as POP MAPI/Exchange, Service APIs and/or any other connection.

In some embodiments, mailbox service 308 can provide digital signature service 318. Digital signature service 318 can generate digital signatures to be added to outgoing messages sent by mailbox service 308. When an outgoing message is received by mailbox service 308 from client device 300, digital signature service 308 can use one or more of message-specific information 320 (such as an account ID or portion of message content) and private key 322 to generate a digital signature. As described above, the digital signature can be generated using a cryptographic hash function, such as SHA-2. The digital signature can be added to the outgoing message, along with a thread ID, by mailbox service 308 before message management service 112 sends the outgoing message to message providers 108 via message service 304 and the appropriate provider module. Additional details of this process are described below, with reference to FIGS. 4 and 5.

Figure 4:
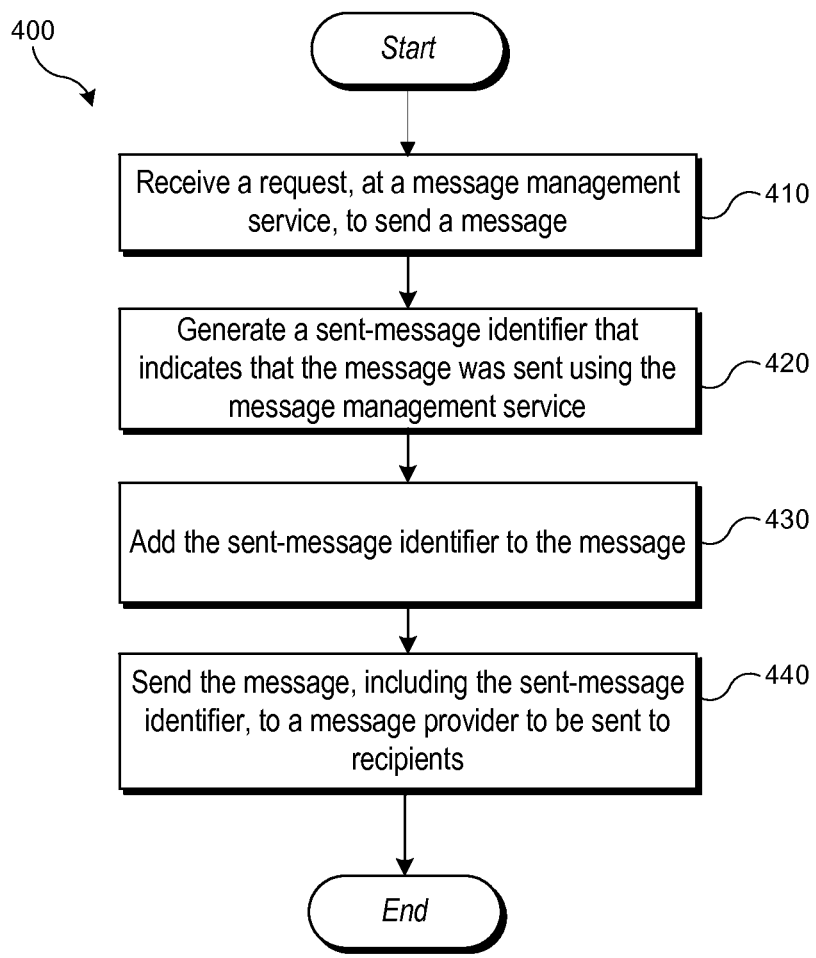
FIG. 4 shows a flow diagram of a process for adding a secure sent-message identifier to a message in accordance with an embodiment of the present invention.

FIG. 4 shows a flow diagram 400 of a process for adding a secure sent-message identifier to a message, in accordance with an embodiment of the present invention. At block 410, message management service 112 can receive a request to send a message. The request can include a copy of the message to be sent. The message can be drafted by a user, e.g., in a message management client executing on client device 102, 104, or 106. As described above, a message (e.g., an email, social media message, micro-blogging message, etc.) can include a header portion and a body portion. The body can include the content of the message and the header can include fields that include metadata about the message.

In some embodiments, the "In-Reply-To" and/or "References" fields can include a thread ID. Each message can be associated with a single thread ID which can be used to manage and organize related messages by a message client or an intermediary service such as message management service 112. As each message is processed, a thread ID can be assigned to each message that has not previously been associated with a thread ID. When a message is received by message management service, e.g. from client 300 or message providers 108, the message's header, can be analyzed to determine if the message is associated with a thread ID, and if it is related to any other messages. If the message is not associated with a thread ID, a new thread ID can be assigned to the message. Thread IDs can be generated based on, e.g., information from a first message in the thread. In some embodiments, a hash function can be applied to the information from the first message in the thread to generate the thread ID. In some embodiments, thread IDs can be assigned in the order in which new threads are identified, with each new thread ID being one integer greater than the previously assigned thread ID.

At block 420, message management service 112 can generate a sent-message identifier for the message. The sent-message identifier can be a digital signature generated by digital signature generator service 318 using a cryptographic hash function. In some embodiments, the sent-message identifier can include the digital signature and additional information, such as a message ID or thread ID. The input to the cryptographic hash function can be a private key, known only to message management service 112, and an item of message-specific information. The item of message-specific information can include a hash value of the message body or portion of the message body, a hash value of the subject or other header field, an account ID associated with the sender of the message, and/or other information. The private key and the item of message-specific information can be concatenated or otherwise combined to form the input to the cryptographic hash function. The digital signature is the output of the cryptographic hash function. The output of the cryptographic hash function can vary in size depending on the cryptographic hash function used. For example, SHA output size can vary from 160-bit to 512-bit. The output can be represented in hexadecimal format, or other formats as desired.

At block 430, the sent-message identifier can be added to the message. In some embodiments, the sent-message identifier can be added to the header of the message. For example, the sent-message identifier can be added to the "References" field or "In-Reply-To" field of the message, or to a custom header field such as an "X-Sent-ID" field. In some embodiments, the sent-message identifier can be added to any field whose contents will propagate into any responsive message, such as message forwarding or replying to the sent message. In some embodiments, the sent-message identifier can be added to the body of the message. At block 440, message management service 112 can send the message, including the sent-message identifier, to a message provider to be sent to one or more recipients.

The sent-message identifier can be used by message management service 112 to reliably determine that a message was sent by message management service 112. Use of the sent-message identifier reduces the likelihood of a successful spoofing attack against message management service 112. If a message is received that purports to have been sent by message management service 112, the digital signature can be used to verify that the message was sent in fact sent by message management service 112. The digital signature can be verified by generating a new digital signature for the received message using the same input and cryptographic hash function. For example, if message management service 112 generates digital signatures by concatenating an account ID associated with the sending user with a private key, and using that as the input to SHA-2, then the same process can be repeated on the received message. The account ID associated with the purported sending user can be concatenated with the private key and then used to generate a second digital signature using SHA-2. If the two digital signatures match, then the message is verified and information in the message, such as the thread ID, can be reliably used to manage the message. If message management service 112 determines that the two digital signatures do not match, message management service 112 can identify the message as an attempted spoofing attack and discard the message. In some embodiments, a sent-message identifier can be added to any message sent by message management service 112. In some embodiments, a sent-message identifier is added only to new messages that are originated in the message management client app and that are not in response to any other message.

Figure 5:
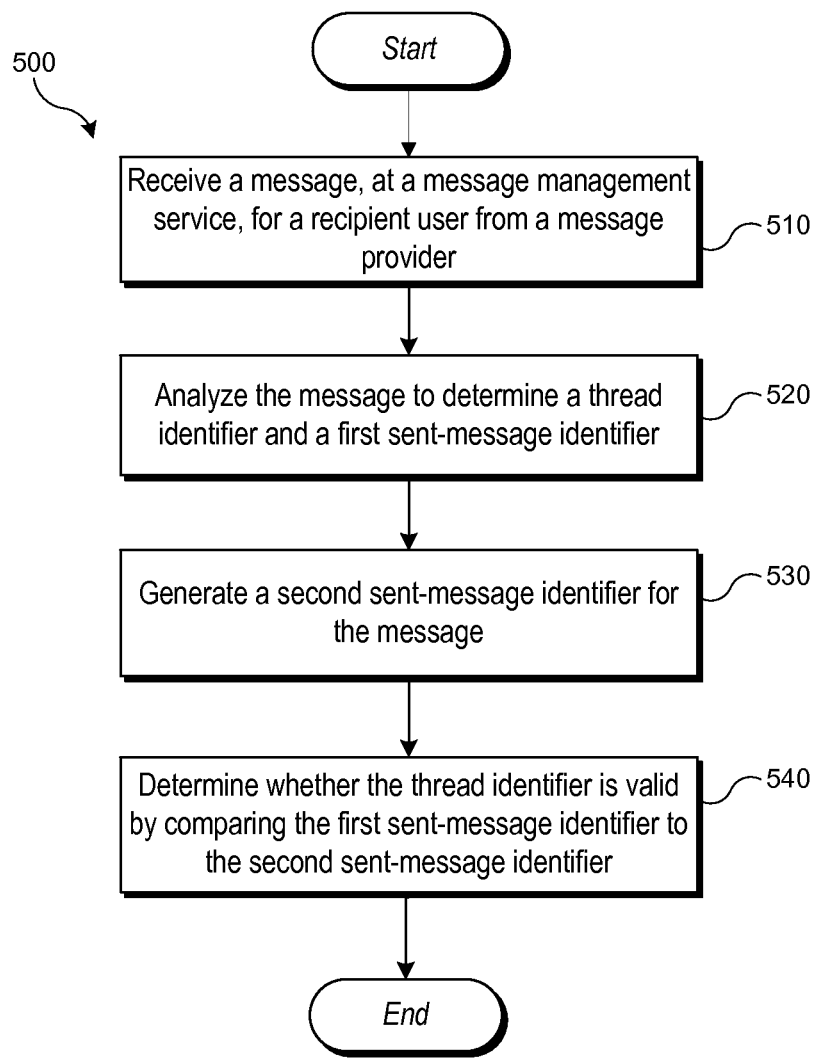
FIG. 5 shows a flow diagram of a process for using a secure sent-message identifier in a received message to confirm a thread identifier in accordance with an embodiment of the present invention.

FIG. 5 shows a flow diagram 500 of a process for using a secure sent-message identifier in a received message to confirm a thread identifier, in accordance with an embodiment of the present invention. At block 510, message management service 112 can receive a message for a recipient user from a message provider. The message can be responsive to a message that was previously sent by the recipient user using message management service 112 (e.g., a reply to, or forward of, the previously sent message). For the purposes of clarity, in this example the message received by message management service 112 is referred to as the child message, and the prior message sent by message management service 112 is referred to as the parent message. At block 520, the child message can be analyzed by the message management service 112 to determine a thread identifier and a first sent-message identifier. If the parent message was sent through message management service 112, the child message can include the thread identifier and first sent-message identifier from the parent message, e.g. in the "References" field of the child message's header. The first sent-message identifier can be used to verify that the child message is in response to the parent message and accordingly that the thread ID is valid and not spoofed.

At 530, message management service 112 can generate a second sent-message identifier for the child message. The second sent-message identifier can be generated using a private key known only to message management service 112 and an item of message-specific information from the parent message that is extracted from the child message. For example, an account ID associated with the recipient user can be used as the item of message-specific information. Additionally, or alternatively, portion of the contents of the "Subject" field can be used as the item of message-specific information. The private key and the item of message-specific information can be concatenated, or otherwise combined, and used as the input to a cryptographic hash function. The output of the cryptographic hash function is the second sent-message identifier. At 540, message management service 112 can determine whether the thread identifier is valid by comparing the first sent-message identifier to the second sent-message identifier. If the first and second sent-message identifiers were generated using the same information combined in the same manner and using the same cryptographic hash function, then the first and second sent-message identifiers should have equal values. If message management service 112 determines that the first and second sent-message identifiers are not equal, message management service 112 can identify the message as an attempted spoofing attack and discard the message. This is useful e.g., to prevent spammers from spoofing a thread ID to make it appear that a spam message is in response to a previous email, which would make it more likely that that spam message would avoid spam filters.

While the invention has been described with respect to specific embodiments, one skilled in the art will recognize that numerous modifications are possible. For example, the particular cryptographic algorithms, data structures, servers, clients, and identifiers described herein are used for purposes of illustration; other events, data structures, servers, clients, and notification channels can be substituted.

While the invention has been described above largely with respect to email messaging, the invention is equally applicable to any electronic message system that is accessible to third party management services. To account for format variations between different types of messages (e.g., text messages, social media messages, micro blogging messages, and instant messages), a third party management service can insert a sent-message into different portions of different types of messages. For example, in message formats that do not include a header, the sent-message identifier can be inserted into the contents of the message. In message formats with content size limitations, such as text messages and micro-blogging messages, a hyperlink or shortened hyperlink can be added to the message content that links to the sent-message identifier at another website or service. Other variations in implementation can similarly be made to adapt to the particular formatting, requirements, and/or limitations of a message or message provider.

Embodiments described above may make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
   receiving a request, at a server of a message management service, to send a message drafted in a client application executing on a client device, wherein the request includes a copy of the message;
   Concatenating an item of message-specific information and a private key;
   generating, by the server, a sent-message identifier for the copy of the message, wherein the sent-message identifier indicates that the message was sent using the message management service, and wherein the sent-message identifier includes a cryptographic hash value generated using the concatenated data corresponding to the message management service as input to a hash function that generates the hash value, wherein the item of message-specific information includes at least a portion of the copy of the message content;

adding, by the server, the sent-message identifier to the copy of the message;

sending, by the server, the copy of the message, including the sent-message identifier, to a message provider to be sent to one or more recipients;

generating, by the server, a thread identifier for the message;

adding the thread identifier to the message before sending the message to the message provider;

after the message has been sent by the message provider, retrieving the message, by the message management service, from the message provider;

analyzing the message to determine a thread identifier and the sent-message identifier;

generating a second sent-message identifier for the message, wherein the second sent-message identifier for the message includes a hash value generated using the item of message-specific information and the private key; and determining whether the thread identifier is valid by comparing the sent-message identifier to the second sent-message identifier, wherein the thread identifier is valid if the sent-message identifier matches the second sent-message identifier.

2. The method of claim 1, wherein the message is an email message.

3. The method of claim 1, wherein the hash value is generated using a secure hash algorithm.

4. The method of claim 3, wherein the item of message-specific information and the private key are concatenated and used as an input to the secure hash algorithm.

5. The method of claim 4, wherein the item of message-specific information includes an account identifier.

6. A server system, comprising:
one or more processors; and
one or more memory devices including instructions stored thereon which, when executed, cause the one or more processors to execute operations including:
receiving a request, at a message management service, to send a message drafted in a client application executing on a client device, wherein the request includes a copy of the message;
concatenating an item of message-specific information and a private key;
generating a sent-message identifier for the copy of the message, wherein the sent-message identifier includes a hash value generated based on the concatenated data as input to a hash function that generates the hash value, wherein the item of message-specific information includes at least a portion of the copy of the message content;
adding the sent-message identifier to the copy of the message;
sending the copy of the message, including the sent-message identifier, to a message provider to be sent to one or more recipients;
generating a thread identifier for the message;
adding the thread identifier to the message before sending the message to the message provider;

after the message has been sent by the message provider, retrieving the message, by the message management service, from the message provider;

analyzing the message to determine a thread identifier and the sent-message identifier;

generating a second sent-message identifier for the message, wherein the second sent-message identifier for the message includes a hash value generated using the item of message-specific information and the private key; and determining whether the thread identifier is valid by comparing the sent-message identifier to the second sent-message identifier, wherein the thread identifier is valid if the sent-message identifier matches the second sent-message identifier.

7. The server system of claim 6, wherein the sent-message identifier is a secure identifier based on an item of message specific information and a private key of the message management service.

8. The server system of claim 7, wherein the item of message-specific information and the private key are concatenated and used as an input to a secure hash algorithm to generate the sent-message identifier.

9. The server system of claim 8, wherein the item of message-specific information includes an account identifier.

10. A non-transitory computer readable medium comprising one or more sequences of instructions, which, when executed by one or more processors, cause the one or more processors to perform operations, comprising:
receiving a request, at a server of a message management service, to send a message drafted in a client application executing on a client device, wherein the request includes a copy of the message;
concatenating an item of message-specific information and a private key;
generating, by the server, a sent-message identifier for the copy of the message, wherein the sent-message identifier indicates that the message was sent using the message management service, and wherein the sent-message identifier includes a cryptographic hash value generated using the concatenated data corresponding to the message management service as input to a hash function that generates the hash value, wherein the item of message-specific information includes at least a portion of the copy of the message content;
adding, by the server, the sent-message identifier to the copy of the message;
sending, by the server, the copy of the message, including the sent-message identifier, to a message provider to be sent to one or more recipients;
generating, by the server, a thread identifier for the message;
adding the thread identifier to the message before sending the message to the message provider;
after the message has been sent by the message provider, retrieving the message, by the message management service, from the message provider;
analyzing the message to determine a thread identifier and the sent-message identifier;
generating a second sent-message identifier for the message, wherein the second sent-message identifier for the message includes a hash value generated using the item of message-specific information and the private key; and
determining whether the thread identifier is valid by comparing the sent-message identifier to the second sent-message identifier, wherein the thread identifier is valid if the sent-message identifier matches the second sent-message identifier.

11. The non-transitory computer readable medium of claim 10, wherein the message is an email message.

12. The non-transitory computer readable medium of claim 10, wherein the hash value is generated using a secure hash algorithm.

13. The non-transitory computer readable medium of claim 12, wherein the item of message-specific information and the private key are concatenated and used as an input to the secure hash algorithm.

14. The non-transitory computer readable medium of claim 13, wherein the item of message-specific information includes an account identifier.

* * * * *